United States Patent
Ono

(10) Patent No.: US 9,233,619 B2
(45) Date of Patent: Jan. 12, 2016

(54) VEHICLE WITH A PLURALITY OF CHARGING MEANS

(75) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 14/131,808

(22) PCT Filed: Jul. 19, 2011

(86) PCT No.: PCT/JP2011/066336
§ 371 (c)(1),
(2), (4) Date: Jan. 9, 2014

(87) PCT Pub. No.: WO2013/011556
PCT Pub. Date: Jan. 24, 2013

(65) Prior Publication Data
US 2014/0197789 A1 Jul. 17, 2014

(51) Int. Cl.
*H02J 7/00* (2006.01)
*B60L 11/18* (2006.01)
(Continued)

(52) U.S. Cl.
CPC ........... *B60L 11/1818* (2013.01); *B60L 3/0069* (2013.01); *B60L 11/005* (2013.01); *B60L 11/123* (2013.01); *B60L 11/14* (2013.01); *B60L 11/1877* (2013.01); *H01M 10/44* (2013.01); *B60L 11/1816* (2013.01); *B60L 2210/10* (2013.01); *B60L 2210/30* (2013.01); *B60L 2210/40* (2013.01); *B60L 2220/14* (2013.01); *B60L 2230/12* (2013.01); *H01M 2220/20* (2013.01); *H01R 2201/26* (2013.01); *Y02T 10/6217* (2013.01); *Y02T 10/7005* (2013.01); *Y02T 10/705* (2013.01); *Y02T 10/7022* (2013.01); *Y02T 10/7077* (2013.01); *Y02T 10/7088* (2013.01); *Y02T 10/7216* (2013.01);
(Continued)

(58) Field of Classification Search
CPC .............. B60L 3/0069; B60L 11/1816; B60L 11/1818; B60L 2230/12; Y02T 90/121; Y02T 10/7077; Y02T 90/14; H01R 2201/26
USPC ........................................................ 320/109
See application file for complete search history.

(56) References Cited

U.S. PATENT DOCUMENTS 8,866,437 B2 * 10/2014 Ichikawa ...................... 320/104
2003/0188798 A1 10/2003 Kawazu et al.
(Continued)

FOREIGN PATENT DOCUMENTS

JP A-2003-291667 10/2003
JP A-2006-223045 8/2006
(Continued)

*Primary Examiner* — Yalkew Fantu
*Assistant Examiner* — Manuel Hernandez
(74) *Attorney, Agent, or Firm* — Oliff PLC

(57) ABSTRACT

A hybrid vehicle includes: a battery; a charging unit and an onboard cable for feeding electric power to the battery from a power supply located externally to the vehicle; an inner lid operated for a charging operation by means of the charging unit; and a harness mechanically coupled to the inner lid for making an electrical connection between the battery and the onboard cable. The harness is configured so that the electrical connection made by the harness between the battery and the onboard cable is severed in response to displacement of the inner lid that is caused when the lid is operated. Accordingly, the vehicle having a simple configuration and including a plurality of charging means for charging the power storage device can be provided.

7 Claims, 10 Drawing Sheets

(51) Int. Cl.
*H01M 10/44* (2006.01)
*B60L 11/00* (2006.01)
*B60L 11/12* (2006.01)
*B60L 11/14* (2006.01)
*B60L 3/00* (2006.01)

(52) U.S. Cl.
CPC ............ *Y02T10/7241* (2013.01); *Y02T 90/121* (2013.01); *Y02T 90/127* (2013.01); *Y02T 90/14* (2013.01)

(56) References Cited

U.S. PATENT DOCUMENTS

| | | |
|---|---|---|
| 2008/0118797 A1 | 5/2008 | Hirakata |
| 2009/0079389 A1 | 3/2009 | Ohtomo |
| 2010/0133024 A1 | 6/2010 | Miwa et al. |
| 2011/0151693 A1 | 6/2011 | Loo et al. |
| 2012/0086267 A1 | 4/2012 | Ichikawa |
| 2012/0256589 A1 | 10/2012 | Ichikawa |

FOREIGN PATENT DOCUMENTS

| | | |
|---|---|---|
| JP | A-2009-027851 | 2/2009 |
| JP | A-2009-062027 | 3/2009 |
| JP | A-2009-077557 | 4/2009 |
| JP | A-2010-052861 | 3/2010 |
| JP | A-2010-172126 | 8/2010 |
| JP | A-2010-187467 | 8/2010 |
| JP | A-2011-015548 | 1/2011 |
| JP | A-2011-126459 | 6/2011 |
| WO | WO 2011/001534 A1 | 1/2011 |
| WO | WO 2011/080814 A1 | 7/2011 |

* cited by examiner

VEHICLE WITH A PLURALITY OF CHARGING MEANS

TECHNICAL FIELD

The present invention relates generally to a vehicle, and more specifically to a vehicle configured so that its power storage device is chargeable with electric power received from a power supply located externally to the vehicle.

BACKGROUND ART

Regarding conventional vehicles, Japanese Patent Laying-Open No. 2011-15548 for example discloses an electrically-powered vehicle having a plurality of means for charging a power storage device and aiming to improve convenience for users (PTD 1).

A hybrid vehicle which is an electrically-powered vehicle disclosed in PTD 1 includes a power cable and an inlet, as well as a charger receiving electric power fed to the power cable and the inlet. In the case where the power cable is used to charge the power storage device, a relay disposed between the charger and the power cable is controlled so that the relay is ON, while a relay disposed between the charger and the inlet is controlled so that this relay is OFF. In the case where the inlet is used to charge the power storage device, the relay disposed between the charger and the power cable is controlled so that this relay is OFF, while the relay disposed between the charger and the inlet is controlled so that this relay is ON.

Japanese Patent Laying-Open No. 2009-27851 discloses a charging port structure of a vehicle with the aim of preventing an inner lid from being left opened while keeping the structure simple (PTD 2). The charging port structure of a vehicle disclosed in PTD 2 includes a charging connector, an inner lid for covering the charging connector, a housing which is a recessed region provided inside the right side of the rear body and in which the charging connector is disposed, and an outer lid for closing an opening of the housing.

Japanese Patent Laying-Open No. 2010-172126 discloses a charging cable for a vehicle with the aim of improving twisting of the cable (PTD 3). The charging cable for a vehicle disclosed in PTD 3 includes a vehicle-side connector which is connectable to a charging port of a vehicle, and a cable having one end connected to the vehicle-side connector and the other end connected to a plug adapted to an external power supply.

Japanese Patent Laying-Open No. 2010-52861 discloses a cord set for charging an electric vehicle with the aim of safe use and good appearance (PTD 4).

The cord set for charging an electric vehicle disclosed in PTD 4 includes a circuit breaker having a pair of terminals for interrupting an electrical circuit between the paired terminals upon occurrence of a ground fault, a first cord having one end provided with a plug to be connected to an outlet installed in a building wall and the other end connected to one of the terminals of the circuit breaker, and a second cord having one end provided with a connector to be connected to an inlet of an electric vehicle and the other end connected to the other terminal of the circuit breaker.

CITATION LIST

Patent Document

PTD 1: Japanese Patent Laying-Open No. 2011-15548
PTD 2: Japanese Patent Laying-Open No. 2009-27851
PTD 3: Japanese Patent Laying-Open No. 2010-172126
PTD 4: Japanese Patent Laying-Open No. 2010-52861

SUMMARY OF INVENTION

Technical Problem

The hybrid vehicle disclosed in PTD 1 has two means, namely the power cable and the inlet, as means for charging the power storage device. In this case, when one of the power cable and the inlet is used to charge the power storage device, it is necessary to prevent the other of them from being active. PTD 1 thus provides a relay between the charger and the power cable and a relay between the charger and the inlet and controls these relays so that they are each made ON or OFF depending on the charging means to be used.

The above-described configuration, however, may suffer, relative to a vehicle having only one means for charging the power storage device, the necessity for a considerable circuit change and/or a greater degree of change to be made in the vehicle.

In view of the above, an object of the present invention is to solve these problems and accordingly provide a vehicle having a simple configuration and including a plurality of charging means for charging a power storage device.

Solution to Problem

A vehicle according to the present invention includes: a power storage device; first charging means and second charging means for feeding electric power to the power storage device from a power supply located externally to the vehicle; an operation member operated for a charging operation by means of the first charging means; and connection means mechanically coupled to the operation member for making an electrical connection between the power storage device and the second charging means. The connection means is configured so that the electrical connection made by the connection means between the power storage device and the second charging means is severed in response to displacement of the operation member that is caused when the operation member is operated.

In the vehicle thus configured, the electrical connection between the power storage device and the second charging means is severed by an operation of the operation member when the first charging means is to be used. Therefore, the circuit of the second charging means that is not used during charging is not made active. Accordingly, the vehicle having a simple configuration and including a plurality of means for charging the power storage device can be achieved.

Preferably, the first charging means is a charging unit to which an external connector belonging to a power supply located externally to the vehicle is connectable. The second charging means is a cable mounted on the vehicle and having a plug which is connectable to a power supply located externally to the vehicle. The connection means is a wire having a connector which is connectable to the charging unit, for making an electrical connection between the charging unit and the cable. The operation member is a lid configured to cover the charging unit and to be openable and closable. The connector is connected to the charging unit with the lid being closed, and removed from the charging unit in response to an operation of opening the lid.

In the vehicle thus configured, the electrical connection between the charging unit and the cable is severed by an operation of opening the lid when the charging unit is to be used. Therefore, the circuit of the cable that is not used during charging is not made active. Accordingly, the vehicle having a simple configuration and including a plurality of means for charging the power storage device can be achieved.

Preferably, the vehicle further includes a charging unit housing having an opening in a surface of a vehicle body for housing the charging unit therein. The lid is an outer lid configured to close the opening of the charging unit housing.

In the vehicle thus configured, the outer lid and the connector can be integrated into one unit to thereby simplify the configuration of the vehicle. Moreover, an operation of opening/closing the outer lid automatically causes the connector to be detached/attached from/to the charging unit, which can facilitate the operation involved in charging.

Preferably, the vehicle further includes: a charging unit housing having an opening in a surface of a vehicle body for housing the charging unit therein; and an outer lid configured to close the opening of the charging unit housing. The lid is an inner lid disposed at the charging unit housing and configured to be attachable to and detachable from the charging unit.

In the vehicle thus configured, the inner lid and the connector can be integrated into one unit to thereby simplify the configuration of the vehicle. Moreover, an operation of opening/closing the inner lid automatically causes the connector to be detached/attached from/to the charging unit, which can facilitate the operation involved in charging.

Preferably, the charging unit housing has a wire extension port for extending the wire toward the charging unit. The wire is configured so that the length of extension of the wire in the charging unit housing from the wire extension port is adjustable.

In the vehicle thus configured, the length of extension of the wire in the charging unit housing from the wire extension port is variable depending on the position of the outer lid or the inner lid that is operated to open or close.

Preferably, the vehicle further includes a cable reel on which the cable can be wound. In the vehicle thus configured, the vehicle can be configured simply to be mounted with means for charging the power storage device, namely the cable which has a plug connectable to a power supply located externally to the vehicle and is wound on a cable reel, as well as a charging unit to which an external connector belonging to a power supply located externally to the vehicle is connectable.

Preferably, the first charging means is a cable mounted on the vehicle and having a plug which is connectable to a power supply located externally to the vehicle. The second charging means is a charging unit to which an external connector belonging to a power supply located externally to the vehicle is connectable. The connection means is a wire having a connector for making an electrical connection between the charging unit and the power storage device. The operation member is a lid configured to cover the plug and to be openable and closable. The lid has a connection unit which is electrically connected to the power storage device and to which the connector is connectable. The connector is connected to the connection unit with the lid being closed, and removed from the connection unit in response to an operation of opening the lid.

In the vehicle thus configured, the electrical connection between the power storage device and the charging unit is severed by an operation of opening the lid when the cable mounted on the vehicle is to be used. Therefore, the circuit of the charging unit that is not used during charging is not made active. Accordingly, the vehicle having a simple configuration and including a plurality of means for charging the power storage device can be achieved.

Advantageous Effects of Invention

As seen from the foregoing, the present invention can provide a vehicle having a simple configuration and including a plurality of charging means for charging a power storage device.

DESCRIPTION OF EMBODIMENTS

Figure 1:
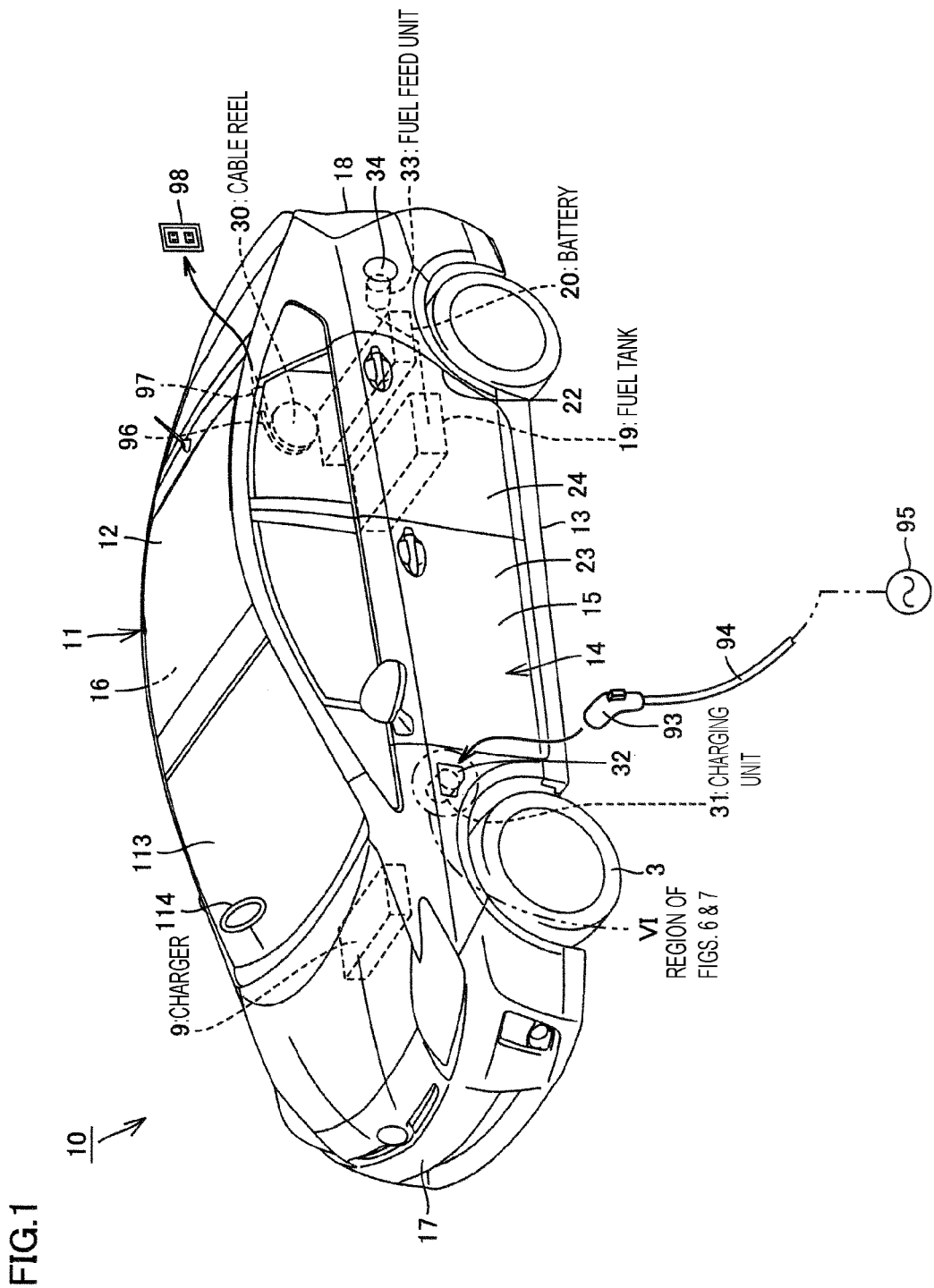
FIG. 1 is a perspective view showing a hybrid vehicle in a first embodiment of the present invention.

Embodiments of the present invention will be described with reference to the drawings. In the drawings referenced below, the same or corresponding members are denoted by the same reference numerals.

First Embodiment

Figure 2:
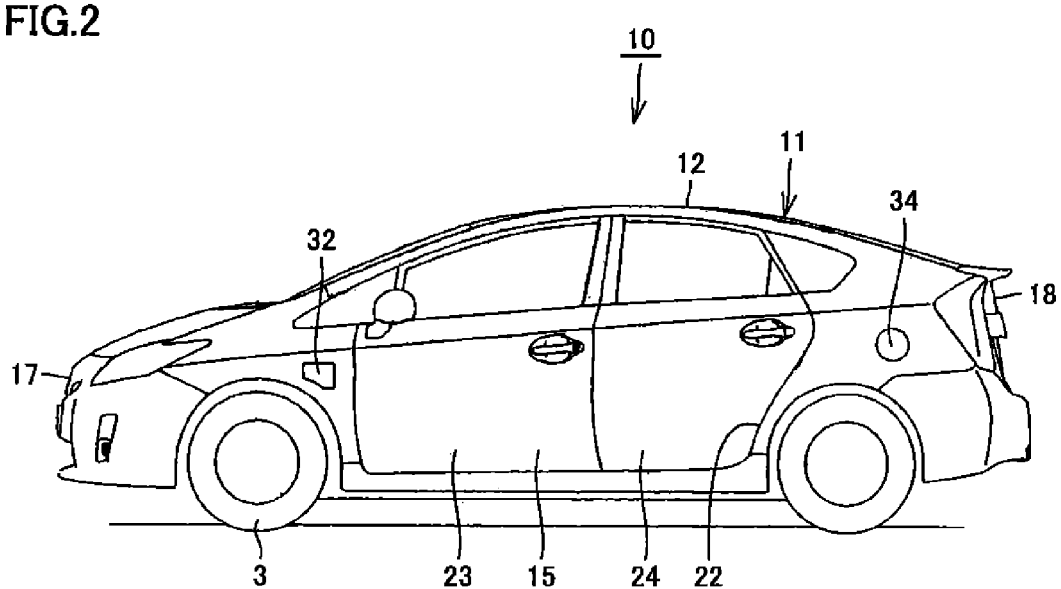
FIG. 2 is a left side view showing the hybrid vehicle in FIG. 1.
Figure 3:
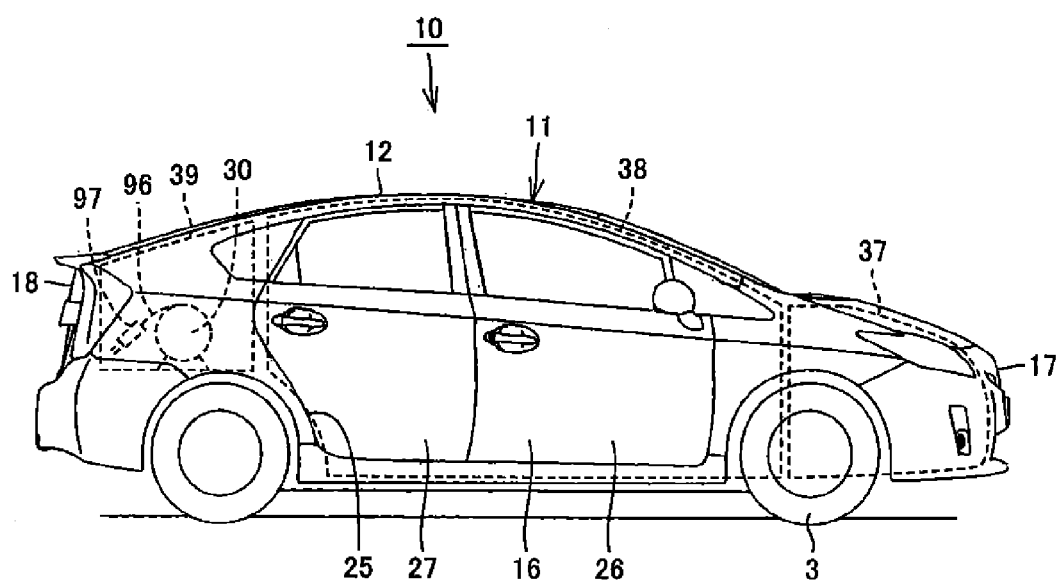
FIG. 3 is a right side view showing the hybrid vehicle in FIG. 1.

FIG. 1 is a perspective view showing a hybrid vehicle in a first embodiment of the present invention. FIG. 2 is a left side view showing the hybrid vehicle in FIG. 1. FIG. 3 is a right side view showing the hybrid vehicle in FIG. 1.

Referring to FIGS. 1 to 3, a hybrid vehicle 10 in the present embodiment has, as its sources of motive power, an engine such as gasoline engine or diesel engine, and a motor supplied with electric power from a chargeable/dischargeable secondary battery (battery).

Hybrid vehicle 10 includes a body 11, a fuel tank 19, and a battery 20.

Body 11 forms the shell of hybrid vehicle 10. The surface of body 11 is made up of a top surface 12, a bottom surface 13, and a circumferential surface 14. Circumferential surface 14 is a surface located along the outer circumference as seen in a plan view of hybrid vehicle 10, and includes a side surface 15, a side surface 16, a front surface 17, and a rear surface 18. Side surface 15 and side surface 16 are located respectively along the lateral sides of the vehicle, front surface 17 is located along the front side of the vehicle, and rear surface 18 is located along the rear side of the vehicle.

In side surface 15, a passenger in/out opening 22 is formed. Passenger in/out opening 22 is provided with doors 23 and 24 so that the opening can be opened or closed. In side surface 16, a passenger in/out opening 25 is formed. Passenger in/out opening 25 is provided with doors 26 and 27 so that the opening can be opened or closed.

A driver seat 113 on which a driver sits is mounted with an operation unit such as a steering wheel 114 for operating hybrid vehicle 10. In the present embodiment, driver seat 113 is arranged at side surface 16 rather than side surface 15. Driver seat 113 may also be arranged at side surface 15 rather than side surface 16.

Hybrid vehicle 10 further includes a fuel feed unit 33 and a lid 34, as well as a charging unit 31 and an outer lid 32.

Fuel feed unit 33 is provided in side surface 15. Fuel feed unit 33 is located relatively closer to the rear side of the vehicle with respect to passenger in/out opening 22. Lid 34 is provided on the surface of body 11 so that the lid is openable and closable. Fuel feed unit 33 is located inside lid 34. Fuel feed unit 33 is connected to fuel tank 19. When hybrid vehicle 10 is to be fed with fuel, lid 34 is opened and a fuel feed nozzle is inserted in fuel feed unit 33. The fuel fed to fuel feed unit 33 is directed to fuel tank 19.

Charging unit 31 has a terminal for being connected with an electric circuit. Charging unit 31 is provided as charging means for receiving electric power supplied from a power supply located outside the vehicle. In the present embodiment, charging unit 31 has a shape to which a connector 93 of a charging cable 94 is connectable so that electric power can be received from an external power supply 95.

Charging unit 31 is provided in side surface 15. Charging unit 31 is located relatively closer to the front side of the vehicle with respect to passenger in/out opening 22. Outer lid 32 is provided on the surface of body 11 so that the outer lid is openable and closable. Charging unit 31 is located inside outer lid 32.

While it has been described in connection with the present embodiment that charging unit 31 is provided in side surface 15 and located relatively closer to the front side of the vehicle with respect to passenger in/out opening 22, the position of charging unit 31 is not limited to the above-described one, and may for example be provided in side surface 15 and located relatively closer to the rear side of the vehicle with respect to passenger in/out opening 22, or provided in side surface 16 and located relatively closer to the front or rear side of the vehicle with respect to passenger in/out opening 22.

Hybrid vehicle 10 further includes an onboard cable 96 and a cable reel 30. Onboard cable 96 is formed of a long electric cable. Onboard cable 96 is provided as charging means for receiving electric power supplied from a power supply located outside the vehicle. In the present embodiment, onboard cable 96 has a plug 97 connectable to a receptacle 98 for receiving electric power supplied from a household power supply. Onboard cable 96 is mounted on hybrid vehicle 10.

Cable reel 30 is provided to serve as a cable storage device for storing onboard cable 96. Cable reel 30 is configured to have a rotatable drum around which onboard cable 96 is wound. The drum may be either rotatable by a motor or rotatable manually. Onboard cable 96 in the form of being wounded around cable reel 30 is mounted on hybrid vehicle 10.

The cable storage device used for storing onboard cable 96 is not limited to cable reel 30, and may for example be a cable storage box in which onboard cable 96 in the form of being folded back and forth on itself is stored.

Hybrid vehicle 10 is configured so that battery 20 is chargeable with electric power supplied from a power supply located externally to the vehicle. Particularly in the present embodiment, two charging means that are charging unit 31 and onboard cable 96 are prepared for use as charging means for charging battery 20, and a user can select an optimum charging mode depending on the environment around the vehicle when the vehicle is to be charged. Typically, in the case where hybrid vehicle 10 is parked in a parking lot of the user's house, onboard cable 96 is unreeled and plug 97 is connected to receptacle 98 so that the vehicle is charged from the household power supply (charging mode by means of onboard cable 96). In the case where hybrid vehicle 10 is dropped at a charging station provided on a public road, connector 93 of charging cable 94 installed in the station is connected to charging unit 31 so that the vehicle is charged from external power supply 95 (charging mode by means of charging cable 94).

Figure 4:
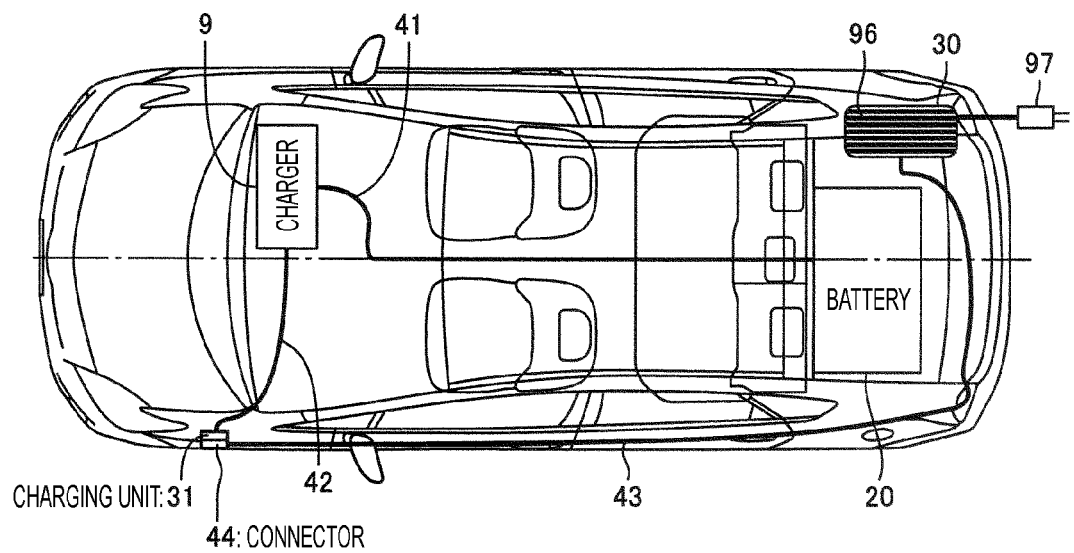
FIG. 4 is a plan view showing the hybrid vehicle in FIG. 1.
Figure 5:
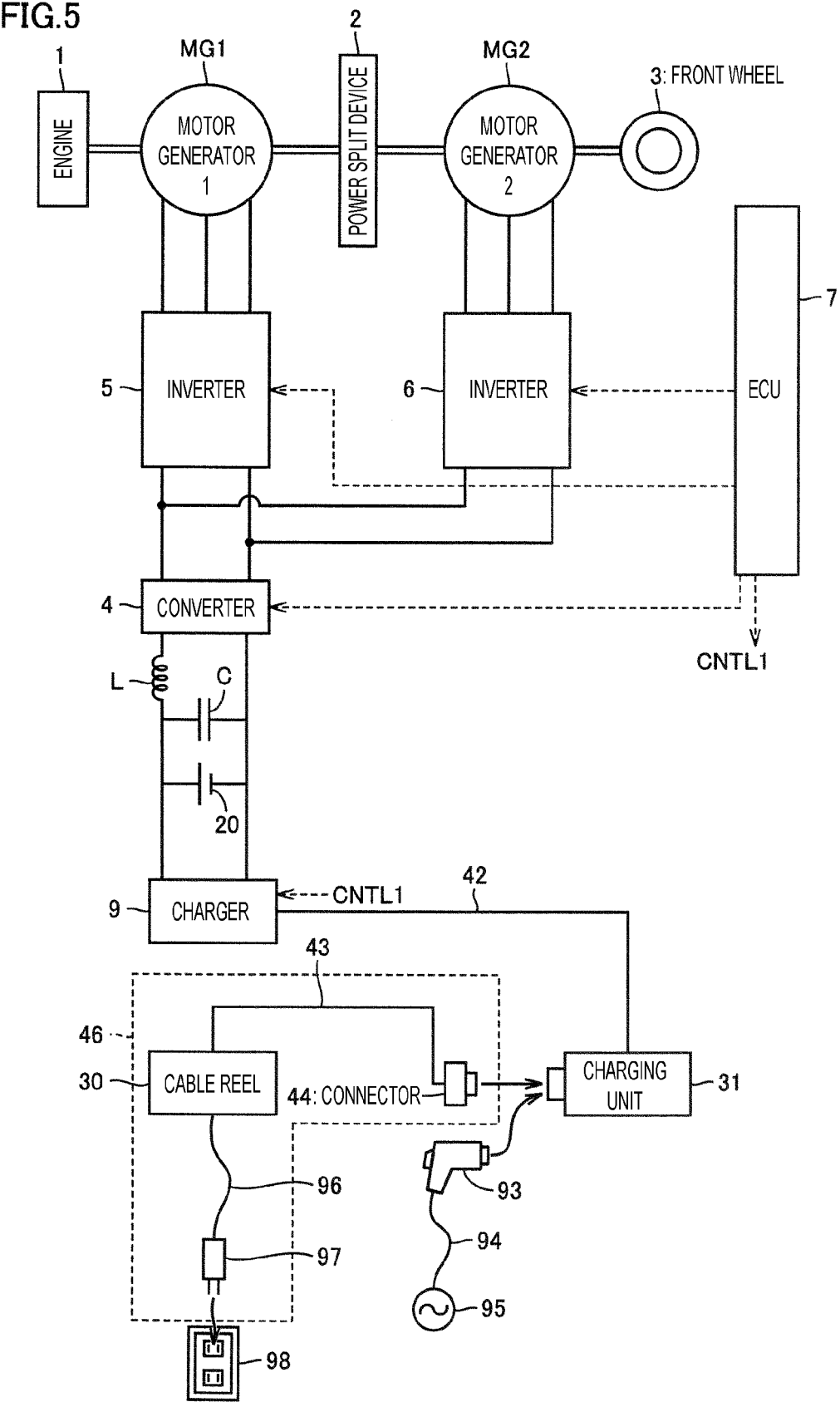
FIG. 5 is a circuit diagram showing a configuration involved in motor generator control for a hybrid vehicle.

FIG. 4 is a plan view showing the hybrid vehicle in FIG. 1. FIG. 5 is a circuit diagram showing a configuration involved in motor generator control for the hybrid vehicle.

Referring to FIGS. 4 and 5, hybrid vehicle 10 further includes an engine 1, motor generators MG1, MG2, a power split device 2, a capacitor C, a reactor L, a converter 4, inverters 5 and 6, a vehicle ECU (Electronic Control Unit) 7, and a charger 9.

Power split device 2 is coupled to engine 1 and motor generators MG1, MG2 to distribute motive power among them. By way of example, a planetary gear train having three rotational shafts respectively of a sun gear, a planetary carrier, and a ring gear is used as power split device 2. These three rotational shafts are connected respectively to respective rotational shafts of engine 1 and motor generators MG1, MG2. For example, a rotor of motor generator MG1 may be hollowed through which a crankshaft of engine 1 is passed, and accordingly engine 1 and motor generators MG1, MG2 are mechanically connected to power split device 2.

The rotational shaft of motor generator MG2 is coupled to a front wheel 3, which is a drive wheel, through a reduction gear or differential gear (not shown). A reduction device for the rotational shaft of motor generator MG2 may further be incorporated in power split device 2.

Motor generator MG1 is installed in hybrid vehicle 10 so that motor generator MG1 operates as an electric generator driven by engine 1 and also operates as an electric motor capable of starting engine 1. Motor generator MG2 is installed in hybrid vehicle 10 so that it operates as an electric motor driving front wheel 3 which is a drive wheel of hybrid vehicle 10.

Motor generators MG1, MG2 are each a three-phase AC synchronous electric motor, for example. Motor generators MG1, MG2 each include three-phase coils that are a U phase coil, a V phase coil, and a W phase coil, as stator coils.

Motor generator MG1 uses an engine output to generate a three-phase AC voltage and outputs the generated three-phase AC voltage to inverter 5. Motor generator MG1 receives a three-phase AC voltage from inverter 5 to generate a drive force and thereby start engine 1.

Motor generator MG2 receives a three-phase AC voltage from inverter 6 to generate a drive torque for the vehicle. When the vehicle is regeneratively braked, motor generator MG2 generates a three-phase AC voltage and outputs it to inverter 6.

As battery 20, a secondary battery such as nickel-metal hydride battery, lithium ion battery, or lead-acid battery, for example, may be used. Instead of battery 20, an electric double-layer capacitor of a large capacity may be used instead of battery 20.

Between battery 20 and charging unit 31, charger 9 is provided. Battery 20 and charger 9 are electrically connected to each other by a harness 41, and charger 9 and charging unit 31 are electrically connected to each other by a harness 42. Charger 9 is driven under control in accordance with a control signal CNTL1 from vehicle ECU 7. Charger 9 functions as an AC/DC converter to convert AC current supplied from an external power supply through charging unit 31 into DC current and provide a predetermined voltage.

Hybrid vehicle 10 further includes a harness 43 having a dedicated connector. Harness 43 is formed of a long electric cable. Harness 43 has one end electrically connected to onboard cable 96. In the present embodiment, the one end of harness 43 is connected to cable reel 30 and then electrically connected within cable reel 30 to onboard cable 96.

Harness 43 has the other end provided with a connector 44. Connector 44 is shaped to be connectable to charging unit 31. Namely, connector 44 of harness 43 and connector 93 of charging cable 94 have the same terminal shape. Specifically, connector 44 and connector 93 are of the same shape having two pins to be fed with electric power, one ground pin, and two pins for signals. With connector 44 connected to charging unit 31, onboard cable 96 and charging unit 31 are electrically connected to each other by harness 43.

As shown in FIG. 3, hybrid vehicle 10 has a drive housing compartment 37 where engine 1, motor generators MG1, MG2, and the like are housed, a passenger compartment 38 where a passenger(s) rides, and a baggage compartment 39 where baggage and the like are placed, which are formed in the vehicle. Drive housing compartment 37 is located relatively closer to the front side of the vehicle with respect to passenger compartment 38, and baggage compartment 39 is located relatively closer to the rear side of the vehicle with respect to passenger compartment 38. In the present embodiment, onboard cable 96 is mounted in baggage compartment 39. Onboard cable 96 is located relatively closer to side surface 16 relative to side surface 15. Onboard cable 96 is disposed on the same side as driver seat 113 which is one of the side surface 15 side and the side surface 16 side.

Onboard cable 96 may instead be disposed on the same side as charging unit 31 which is the other of the side surface 15 side and the side surface 16 side. The location of onboard cable 96 is not limited to baggage compartment 39 and may be mounted in drive housing compartment 37.

Referring to FIGS. 1 to 5, in the case where the charging mode by means of onboard cable 96 is adopted for hybrid vehicle 10 in the present embodiment, plug 97 of onboard cable 96 is connected to receptacle 98 with connector 44 being connected to charging unit 31. Accordingly, the electric power of a household power supply is fed to battery 20 through onboard cable 96 and harness 43. In contrast, in the case where the charging mode by means of charging cable 94 is adopted, connector 44 is removed from charging unit 31 and connector 93 of charging cable 94 is connected to charging unit 31. Accordingly, the electric power of external power supply 95 is fed to battery 20 through charging cable 94.

In the above-described configuration, connector 44 is removed from charging unit 31 when the charging mode by mean of charging cable 94 is adopted, and therefore, the circuit which connects harness 43, cable reel 30, and onboard cable 96 and is not used during charging of battery 20 in this mode is not made active. Accordingly, in the case where a cable reel set 46 (see FIG. 5) made up of onboard cable 96, cable reel 30, and harness 43 is added to a vehicle which adopts only the charging mode by means of charging cable 94, it is unnecessary to provide relay control for making the circuit ON or OFF and thus it is unnecessary to make a significant change in the system of vehicle ECU 7.

Figure 6:
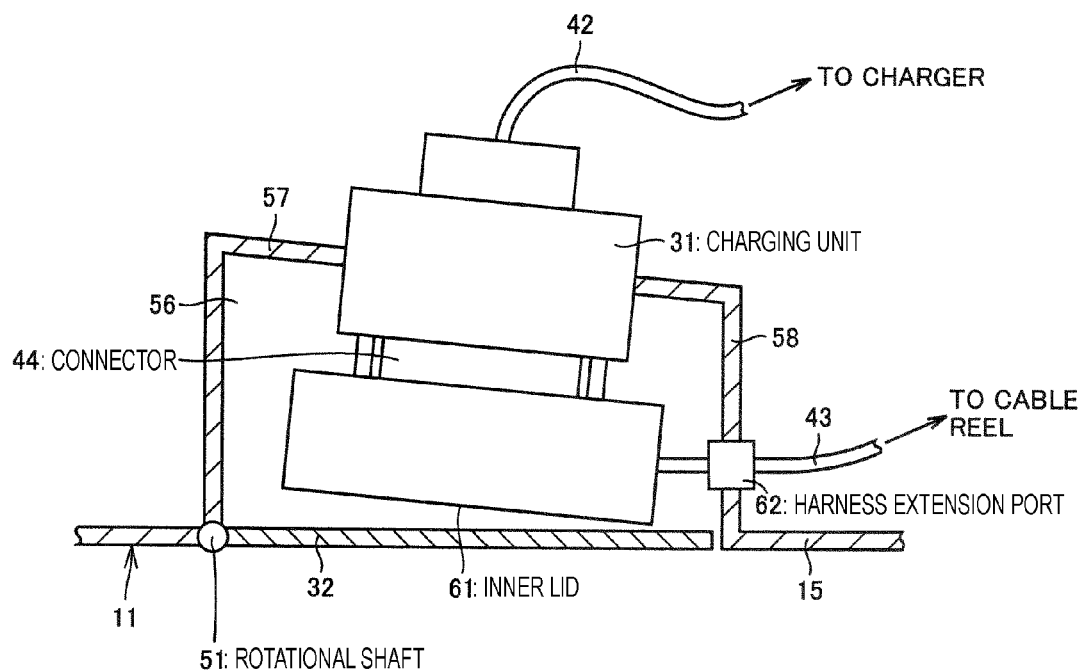
FIG. 6 is a cross-sectional view showing a charging unit in the case where a charging mode by means of an onboard cable is adopted.
Figure 7:
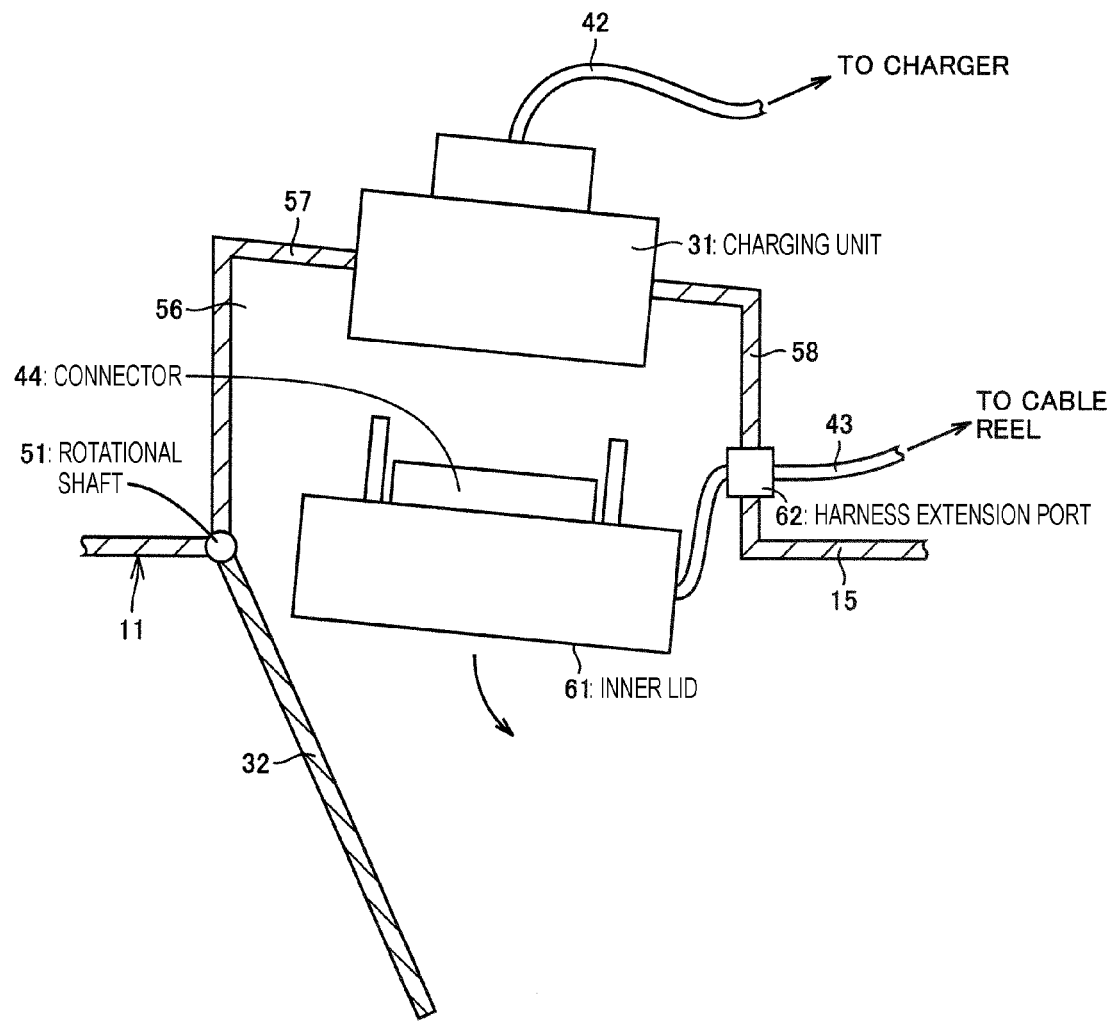
FIG. 7 is a cross-sectional view showing the charging unit in the case where a charging mode by means of a charging cable is adopted.

FIG. 6 is a cross-sectional view showing the charging unit in the case where the charging mode by means of the onboard cable is adopted. FIG. 7 is a cross-sectional view showing the charging unit in the case where the charging mode by means of the charging cable is adopted. In FIGS. 6 and 7 each, the region enclosed by a two-dot chain line VI in FIG. 1 is shown.

Referring to FIG. 6, hybrid vehicle 10 includes a charging unit housing 56 and an inner lid 61.

Charging unit housing 56 is formed by a recess which opens in the surface of body 11. In the present embodiment, charging unit housing 56 is formed by the recess which opens in side surface 15. Charging unit housing 56 is defined by a sidewall 58 continuing from side surface 15 and arranged in a cylindrical shape, and a bottom wall 57 located opposite to the opening in side surface 15. In charging unit housing 56, charging unit 31 is housed. Charging unit 31 is secured to bottom wall 57.

Outer lid 32 is configured to close the opening of charging unit housing 56. Outer lid 32 is attached to side surface 15 so that the outer lid is openable and closable. Outer lid 32 is arranged pivotably about a rotational shaft 51 supported on side surface 15.

Inner lid 61 is disposed in charging unit housing 56. Inner lid 61 is arranged so that it is attachable to and detachable from charging unit 31. Inner lid 61 is arranged to cover terminals of charging unit 31. In the present embodiment, inner lid 61 is mounted with connector 44 of harness 43. With inner lid 61 attached to charging unit 31, connector 44 is connected to charging unit 31. With inner lid 61 detached from charging unit 31, connector 44 is detached from charging unit 31.

In the above-described configuration, inner lid 61 is attached to charging unit 31 with outer lid 32 being closed. Therefore, when the charging mode by means of onboard cable 96 is adopted, connector 44 is being connected to charging unit 31 without access to charging unit 31. Accordingly, battery 20 is charged by connecting plug 97 of onboard cable 96 to receptacle 98. In contrast, when the charging mode by means of charging cable 94 is adopted, outer lid 32 is opened and inner lid 61 is detached from charging unit 31 to thereby detach connector 44 from charging unit 31. Then, connector 93 of charging cable 94 is connected to charging unit 31 to thereby charge battery 20.

In this configuration, inner lid 61 and connector 44 can be integrated into one unit to thereby simplify the configuration of hybrid vehicle 10. In addition, an operation of opening or closing inner lid 61 automatically causes connector 44 to be detached from or attached to charging unit 31, which can facilitate the operation involved in charging.

Hybrid vehicle 10 further includes a harness extension port 62. Harness extension port 62 is formed by a bush through which harness 43 can be passed. Harness extension port 62 is secured to sidewall 58. Harness 43 is inserted through harness extension port 62 to extend into charging unit housing 56. Harness 43 is inserted slidably through harness extension port 62.

The above configuration allows the length of harness 43 extended in charging unit housing 56 through harness extension port 62 to be adjustable. Therefore, in the case where the charging mode by means of charging cable 94 is adopted, inner lid 61 removed from charging unit 31 can be withdrawn to an appropriate position where the inner lid 61 does not interfere with connector 93 of charging cable 94.

The following is a summary of the structure of hybrid vehicle 10 in the first embodiment of the present invention as described above. Hybrid vehicle 10 which is a vehicle in the present embodiment includes: battery 20 as a power storage device; charging unit 31 as first charging means and onboard cable 96 as second charging means that are provided for feeding electric power to battery 20 from a power supply located externally to the vehicle; inner lid 61 as an operation member which is operated for a charging operation by means of charging unit 31; and harness 43 mechanically coupled to inner lid 61 for making an electrical connection between battery 20 and onboard cable 96. Harness 43 is configured so that the electrical connection made by harness 43 between battery 20 and onboard cable 96 is severed in response to displacement of inner lid 61 that is caused when inner lid 61 is operated.

The first charging means is charging unit 31 to which connector 93 serving as an external connector belonging to external power supply 95, which is a power supply located externally to the vehicle, is connectable. The second charging means is onboard cable 96 mounted on the vehicle and having plug 97 which is connectable to receptacle 98 of a power supply located externally to the vehicle. The connection means is harness 43 having connector 44 which is connectable to charging unit 31, for making an electrical connection between charging unit 31 and onboard cable 96. The operation member is inner lid 61 serving as a lid configured to cover charging unit 31 and to be openable and closable. Connector 44 is connected to charging unit 31 with lid 61 being closed, and removed from charging unit 31 in response to an operation of opening inner lid 61.

In hybrid, vehicle 10 of the first embodiment of the present invention configured in the above-described manner, when the charging mode by means of onboard cable 96 is adopted, connector 44 of harness 43 is connected to charging unit 31 and, when the charging mode by means of charging cable 94 is adopted, connector 44 is removed from charging unit 31 and instead connector 93 of charging cable 94 is connected to charging unit 31. Therefore, in a vehicle in which only one charging means for battery 20 is provided, the necessity for a significant circuit change and/or a greater degree of change to be made in the vehicle can be avoided. Accordingly, hybrid vehicle 10 including a plurality of charging means can simply be configured.

The present invention is also applicable to a fuel cell hybrid vehicle (FCHV) using a fuel cell and a secondary battery as its motive power sources, or an electric vehicle (EV). In the hybrid vehicle of the present embodiment, the internal combustion engine is driven at an operating point where fuel consumption is optimum. As for the fuel cell hybrid vehicle, the fuel cell is driven at an operating point where the power generation efficiency is optimum. In terms of use of the secondary battery, these hybrid vehicles are basically identical to each other.

Second Embodiment

Figure 8:
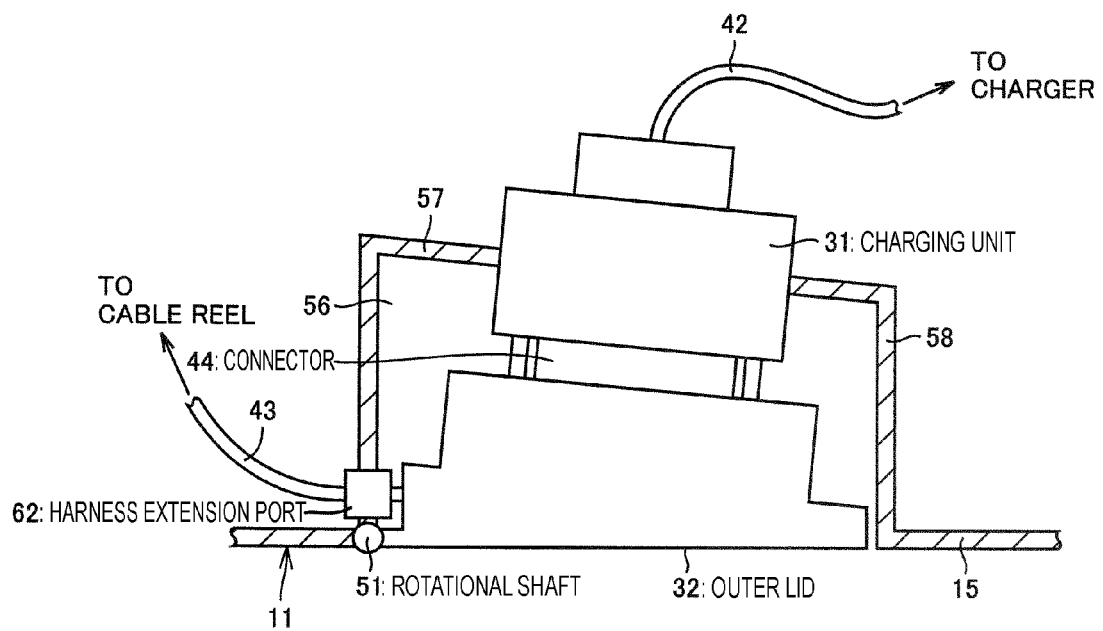
FIG. 8 is a cross-sectional view showing a hybrid vehicle in a second embodiment of the present invention.
Figure 9:
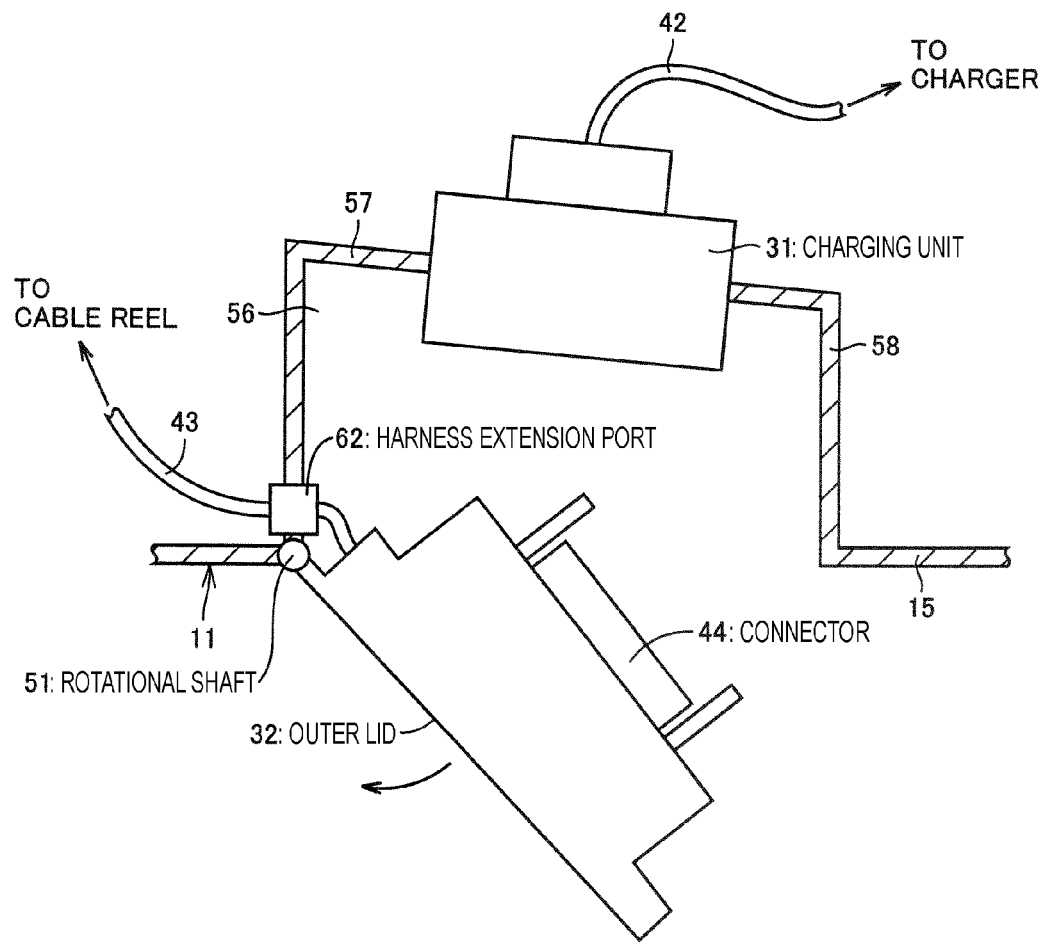
FIG. 9 is another cross-sectional view showing the hybrid vehicle in the second embodiment of the present invention.

FIGS. 8 and 9 are each a cross-sectional view showing a hybrid vehicle in a second embodiment of the present invention. FIGS. 8 and 9 correspond respectively to FIGS. 6 and 7 in the first embodiment. The hybrid vehicle in the present embodiment has a structure basically similar to that of hybrid vehicle 10 in the first embodiment. In the following, the description of features common to the first and second embodiments will not be repeated.

Referring to FIGS. 8 and 9, in the present embodiment, charging unit housing 56 is not equipped with inner lid 61 shown in FIGS. 6 and 7. Outer lid 32 is configured to close the opening of charging unit housing 56 and cover the terminals of charging unit 31 when outer lid 32 is being closed. Outer lid 32 is equipped with connector 44 of harness 43. With outer lid 32 closed, connector 44 is connected to charging unit 31. With outer lid 32 opened, connector 44 is removed from charging unit 31.

In the above-described configuration, in the case where the charging mode by means of onboard cable 96 is adopted, connector 44 is being connected to charging unit 31 with outer lid 32 closed. Then, plug 97 of onboard cable 96 is connected to receptacle 98 to thereby cause battery 20 to be charged. In contrast, in the case where the charging mode by means of charging cable 94 is adopted, outer lid 32 is opened to cause connector 44 to be removed from charging unit 31. Then, connector 93 of charging cable 94 is connected to charging unit 31 to thereby cause battery 20 to be charged.

In this configuration, outer lid 32 and connector 44 can be integrated into one unit to thereby simplify the configuration of hybrid vehicle 10. In addition, an operation of opening or closing outer lid 32 automatically causes connector 44 to be detached from or attached to charging unit 31, which can facilitate the operation involved in charging.

From the hybrid vehicle in the second embodiment of the invention configured in the above-described manner, the effects described above in connection with the first embodiment can be obtained as well.

The manner in which connector 44 is configured is not limited to the manner described above in connection with the first and second embodiments. For example, in FIGS. 6 and 7, an actuator may be provided to cause inner lid 61 to be detached from or attached to charging unit 31 in response to an operation of opening or closing outer lid 32.

The invention described above in connection with the first and second embodiments will now be described in terms of another aspect. Specifically, the vehicle of the present invention is a vehicle configured so that its power storage device is chargeable with electric power received from a power supply located externally to the vehicle. The vehicle includes a cable mounted on the vehicle, a charging unit, and a wire for making an electrical connection between the charging unit and the cable. The cable has a plug which is connectable to a power supply located externally to the vehicle. To the charging unit, an external connector belonging to a power supply located externally to the vehicle is connectable. The wire has a connector which is connectable to the charging unit. When the plug is connected to a power supply located externally to the vehicle to thereby cause the power storage device to be charged, the connector is connected to the charging unit. When the external connector is connected to the charging unit to thereby cause the power storage device to be charged, the connector is removed from the charging unit.

In the vehicle configured in the above-described manner, charging means for charging the power storage device are provided, namely there are provided the cable having the plug which is connectable to a power supply located externally to the vehicle, and the charging unit to which an external connector belonging to a power supply located externally to the vehicle is connectable. When the charging means is used to cause the power storage device to be charged and accordingly one of the connector and the external connector is connected to the charging unit, the other of the connector and the external connector is removed from the charging unit. Therefore, the circuit of the charging means which is not used during charging will not be made active. Accordingly, the vehicle having a simple configuration and including a plurality of means for charging the power storage device can be achieved.

Preferably, the vehicle further includes a lid configured to cover the charging unit and to be openable and closable. The lid is equipped with the connector. With the lid closed, the connector is connected to the charging unit. With the lid opened, the connector is removed from the charging unit.

In the vehicle thus configured, the lid and the connector can be integrated into one unit to thereby simplify the configuration of the vehicle. In addition, an operation of opening or closing the lid automatically causes the connector to be detached from or attached to the charging unit, which can facilitate the operation involved in charging.

Preferably, the vehicle further includes a charging unit housing which has an opening in a surface of a vehicle body and in which the charging unit is housed. The lid is an outer lid for closing the opening of the charging unit housing.

In the vehicle thus configured, the outer lid and the connector can be integrated into one unit to thereby simplify the configuration of the vehicle. In addition, an operation of opening or closing the outer lid automatically causes the connector to be detached from or attached to the charging unit, which can facilitate the operation involved in charging.

Preferably, the vehicle further includes a charging unit housing which has an opening in a surface of a vehicle body and in which the charging unit is housed, and an outer lid for closing the opening of the charging unit housing. The lid is an inner lid disposed at the charging unit housing and configured to be attachable to and detachable from the charging unit.

In the vehicle thus configured, the inner lid and the connector can be integrated into one unit to thereby simplify the configuration of the vehicle. In addition, an operation of opening or closing the inner lid automatically causes the connector to be detached from or attached to the charging unit, which can facilitate the operation involved in charging.

Preferably, the charging unit housing has a wire extension port formed to allow the wire to be extended toward the charging unit. The wire is configured so that the length of extension of the wire in the charging unit from the wire extension port is adjustable.

In the vehicle thus configured, depending on the position of the outer lid or the inner lid that is operated to open or close, the length of extension of the wire in the charging unit housing that is extended from the wire extension port is variable.

Preferably, the vehicle further includes a cable reel on which the cable can be wound. In the vehicle thus configured, the cable which has the plug connectable to a power supply located externally to the vehicle and is wound around the cable reel as well as the charging unit to which an external connector belonging to a power supply located externally to the vehicle is connectable, which are provided as charging means for charging the power storage device, can be mounted on the vehicle with a simple configuration.

Third Embodiment

Figure 10:
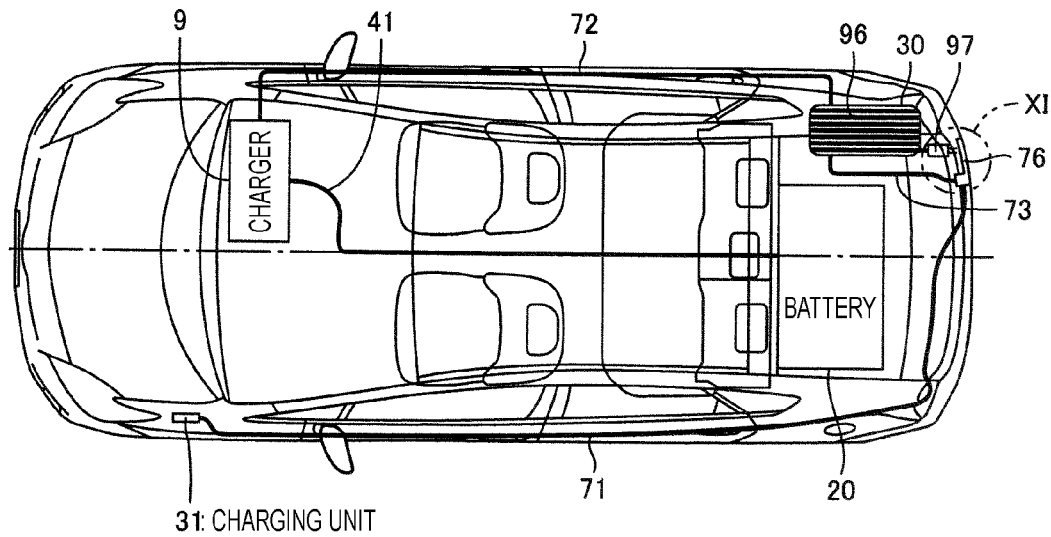
FIG. 10 is a plan view showing a hybrid vehicle in a third embodiment of the present invention.
Figure 11:
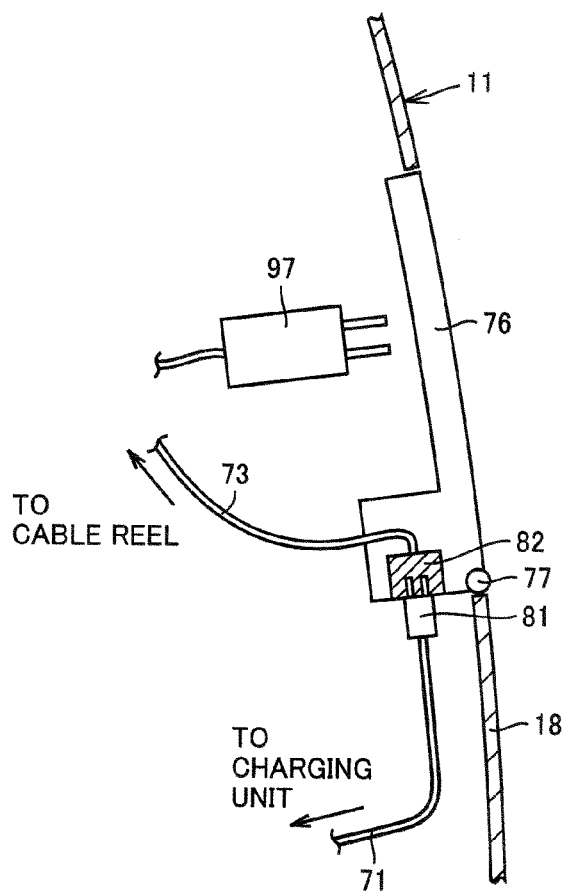
FIG. 11 is a cross-sectional view showing the hybrid vehicle in the case where the charging mode by means of a charging cable is adopted.
Figure 12:
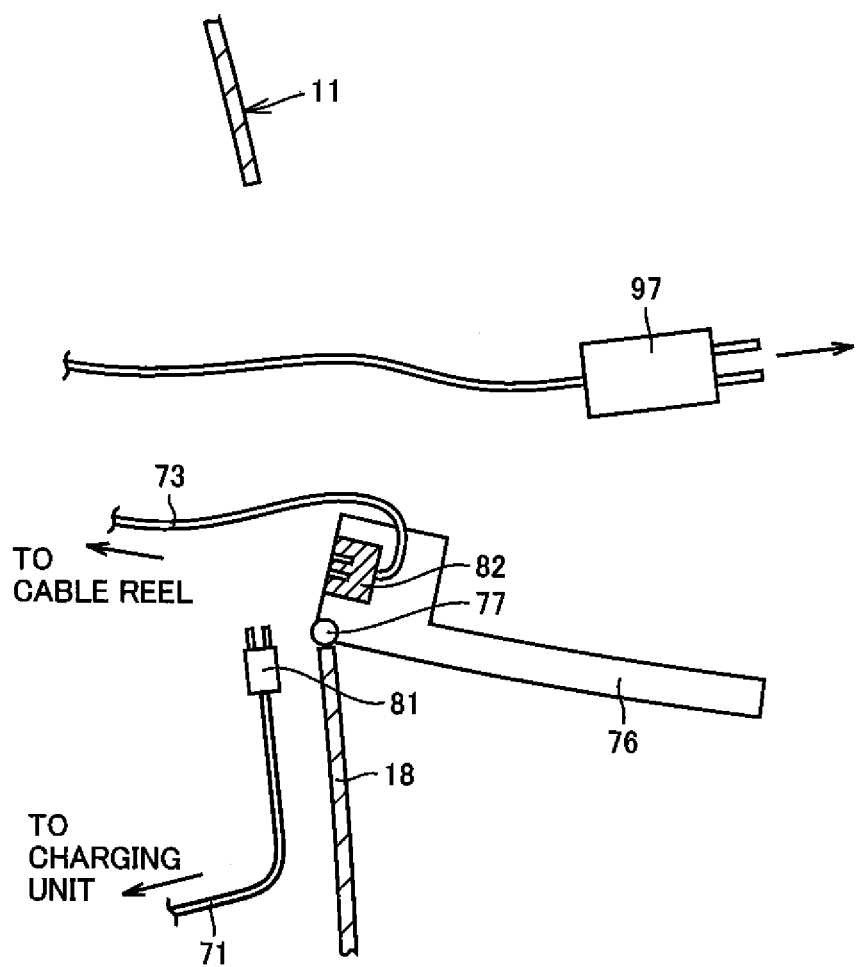
FIG. 12 is a cross-sectional view showing the hybrid vehicle in the case where the charging mode by means of an onboard cable is adopted.

FIG. 10 is a plan view of a hybrid vehicle in a third embodiment of the present invention. FIG. 11 is a cross-sectional view showing the hybrid vehicle in the case where the charging mode by means of a charging cable is adopted. FIG. 12 is a cross-sectional view showing the hybrid vehicle in the case where the charging mode by means of an onboard cable is adopted. In FIGS. 11 and 12 each, the region enclosed by a two-dot chain line XI in FIG. 10 is shown.

The hybrid vehicle in the present embodiment has a structure basically similar to that of hybrid vehicle 10 in the first embodiment. In the following, the description of features common to the first and third embodiments will not be repeated.

Referring to FIGS. 10 to 12, the hybrid vehicle in the present embodiment includes a lid 76. Lid 76 is provided to close an opening through which plug 97 of onboard cable 96 is drawn out. Lid 76 is attached to rear surface 18 in such a manner that lid 76 is openable and closable. Lid 76 may instead be attached to side surface 16 in FIG. 1 in such a manner that lid 76 is openable and closable. Lid 76 is arranged pivotably about a rotational shaft 77 supported on rear surface 18.

Lid 76 is equipped with a connection unit 82. Connection unit 82 has a shape that enables a connector 81 of a harness 71, which is described later herein, to be connected to connection unit 82. Connection unit 82 is placed at a position adjacent to rotational shaft 77.

In contrast to hybrid vehicle 10 in the first embodiment, the present embodiment does not provide harness 42 shown in FIG. 4 for making an electrical connection between charger 9 and charging unit 31, and harness 43 shown in FIG. 4 for making an electrical connection between onboard cable 96 and charging unit 31. The hybrid vehicle in the present embodiment includes harness 71, as well as a harness 72 and a harness 73.

Harness 72 electrically connects charger 31 and onboard cable 96 to each other. In the present embodiment, harness 72 has one end connected to cable reel 30 and then electrically connected, in cable reel 30, to onboard cable 96. Harness 73 electrically connects connection unit 82 provided to lid 76 and harness 72 to each other. In the present embodiment, harness 73 has one end connected to cable reel 30 and then connected, in cable reel 30, to harness 72.

Harness 71 is provided to electrically connect charging unit 31 and battery 20 to each other. Specifically, one end of harness 71 is connected to charging unit 31. The other end of harness 71 is equipped with connector 81. Connector 81 has a shape connectable to connection unit 82. With connector 81 connected to connection unit 82, charging unit 31 and battery 20 are electrically connected to each other through harness 71, harness 73, harness 72, and harness 41.

Connector 81 is supported at a certain position by a support member which is not shown. In the present embodiment, with lid 76 closed, connector 81 is connected to connection unit 82 and, with lid 76 opened, connector 81 is removed from connection unit 82.

In this configuration, in the case where the charging mode by means of charging cable 94 is adopted, lid 76 in which plug 97 of onboard cable 96 is housed is closed. Thus, connector 81 is connected to connection unit 82 and accordingly charging unit 31 and battery 20 are electrically connected to each other. Then, connector 93 of charging cable 94 can be connected to charging unit 31 to thereby cause battery 20 to be charged. At this time, plug 97 of onboard cable 96 is located inside lid 76 and therefore, an operator will not access plug 76.

In contrast, in the case where the charging mode by means of onboard cable 96 is adopted, lid 76 is opened to allow connector 81 to be removed from connection unit 82. Then, connector 93 of charging cable 94 is drawn out to be connected to receptacle 98 to thereby cause battery 20 to be charged. At this time, an operation of opening lid 76 causes connector 81 to be removed from connection unit 82. Therefore, the circuit of the charging unit 31 that is not used during charging of battery 20 will not be made active.

In the present embodiment, the first charging means is onboard cable 96 provided as a cable mounted on the vehicle and having plug 97 which is connectable to receptacle 98 for a power supply located externally to the vehicle. The second charging means is charging unit 31 to which connector 93 provided as an external connector belonging to external power supply 95 which is a power supply located externally to the vehicle is connectable. The connection means is harness 71 provided as a wire having connector 81 for making an electrical connection between charging unit 31 and battery 20. The operation member is lid 76 configured to cover plug 97 and to be openable and closable. Lid 76 has connection unit 82 which is electrically connected to battery 20 and to which connector 81 is connectable. With lid 76 closed, connector 81 is connected to connection unit 82. Connector 81 is removed from connection unit 82 in response to an operation of opening lid 76.

While the present embodiment provides the configuration in which the electrical connection between charging unit 31 and battery 20 is severed in response to the operation of opening lid 76, the present invention is not limited to this. For example, the electrical connection between charging unit 31 and battery 20 may be severed in response to an operation of drawing out connector 93 of charging cable 94.

From the above-described hybrid vehicle in the third embodiment of the present invention, the effects described above in connection with the first embodiment can be obtained as well.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is applicable to a vehicle configured so that its power storage device is chargeable with electric power received from a power supply located externally to the vehicle.

REFERENCE SIGNS LIST 1 engine; 2 power split device; 3 front wheel; 4 converter; 5, 6 inverter; 9 charger; 10 hybrid vehicle; 11 body; 12 top surface; 13 bottom surface; 14 circumferential surface; 15, 16 side surface; 17 front surface; 18 rear surface; 19 fuel tank; 20 battery; 22, 25 passenger in/out opening; 23, 24, 26, 27 door; 30 cable reel; 31 charging unit; 32 outer lid; 33 fuel feed unit; 34 lid; 37 drive housing compartment; 38 passenger compartment; 39 baggage compartment; 41, 42, 43 harness; 44 connector; 46 cable reel set; 51 rotational shaft; 56 charging unit housing; 57 bottom wall; 58 sidewall; 61 inner lid; 62 cable extension port; 93 connector; 94 charging cable; 95 external power supply; 96 onboard cable; 97 plug; 98 receptacle; 113 driver seat; 114 steering wheel

The invention claimed is:

1. A vehicle comprising:
a power storage device;
first charging means and second charging means for feeding electric power to said power storage device from a power supply located externally to the vehicle;
an operation member operated for a charging operation by means of said first charging means; and
connection means mechanically coupled to said operation member for making an electrical connection between said power storage device and said second charging means,
said connection means being configured so that the electrical connection made by said connection means between said power storage device and said second charging means is severed in response to displacement of said operation member that is caused when said operation member is operated,
said first charging means being a charging unit to which an external connector belonging to the power supply located externally to the vehicle is connectable,
said second charging means being a cable mounted on the vehicle and having a plug which is connectable to the power supply located externally to the vehicle,
said connection means being a wire having a connector which is connectable to said charging unit, for making an electrical connection between said charging unit and said cable,
said operation member being a lid configured to cover said charging unit and to be openable and closable, and
said connector being connected to said charging unit with said lid being closed, and removed from said charging unit in response to an operation of opening said lid.

2. The vehicle according to claim 1, further comprising a charging unit housing having an opening in a surface of a body of the vehicle for housing said charging unit therein, wherein
said lid is an outer lid configured to close the opening of said charging unit housing.

3. The vehicle according to claim 1, further comprising:
a charging unit housing having an opening in a surface of body of the vehicle for housing said charging unit therein; and
an outer lid configured to close the opening of said charging unit housing, wherein
said lid is an inner lid disposed at said charging unit housing and configured to be attachable to and detachable from said charging unit.

4. The vehicle according to claim 2, wherein
said charging unit housing has a wire extension port formed to allow said wire to be extended toward said charging unit, and
said wire is configured so that a length of extension of said wire in said charging unit housing from said wire extension port is adjustable.

5. The vehicle according to claim 1, further comprising a cable reel on which said cable can be wound.

6. A vehicle comprising:
a power storage device;
first charging means and second charging means for feeding electric power to said power storage device from a power supply located externally to the vehicle;
an operation member operated for a charging operation by means of said first charging means; and
connection means mechanically coupled to said operation member for making an electrical connection between said power storage device and said second charging means,
said connection means being configured so that the electrical connection made by said connection means between said power storage device and said second charging means is severed in response to displacement of said operation member that is caused when said operation member is operated,
said first charging means being a cable mounted on the vehicle and having a plug which is connectable to the power supply located externally to the vehicle,
said second charging means being a charging unit to which an external connector belonging to the power supply located externally to the vehicle is connectable,
said connection means being a wire having a connector for making an electrical connection between said charging unit and said power storage device, said operation member being a lid configured to cover said plug and to be openable and closable, said lid having a connection unit which is electrically connected to said power storage device and to which said connector is connectable, and said connector being connected to said connection unit with said lid being closed, and removed from said connection unit in response to an operation of opening said lid.

7. The vehicle according to claim 3, wherein said charging unit housing has a wire extension port formed to allow said wire to be extended toward said charging unit, and said wire is configured so that a length of extension of said wire in said charging unit housing from said wire extension port is adjustable.

* * * * *